G. CASSADY.
POWER TRANSLATING MECHANISM.
APPLICATION FILED APR. 18, 1911.
1,001,816.
Patented Aug. 29, 1911.
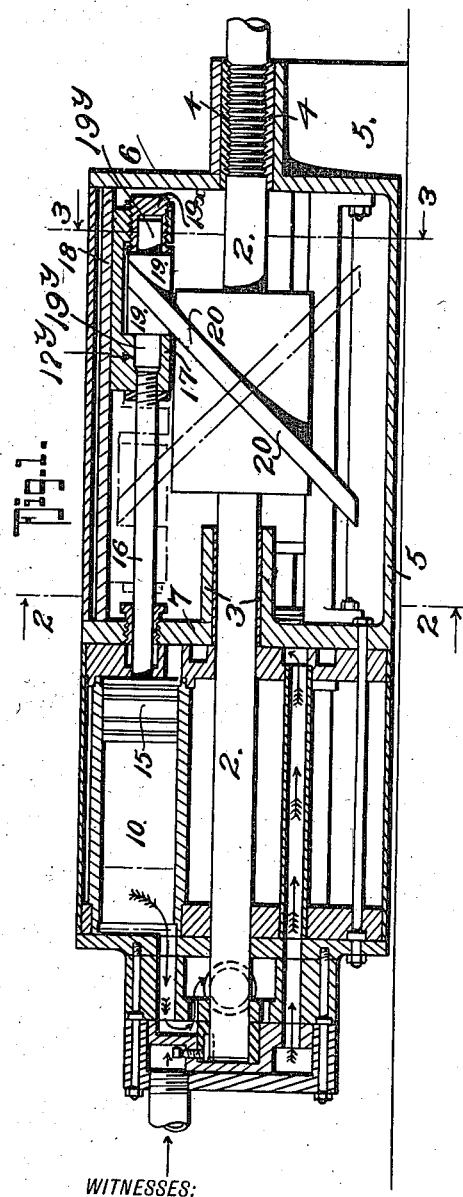
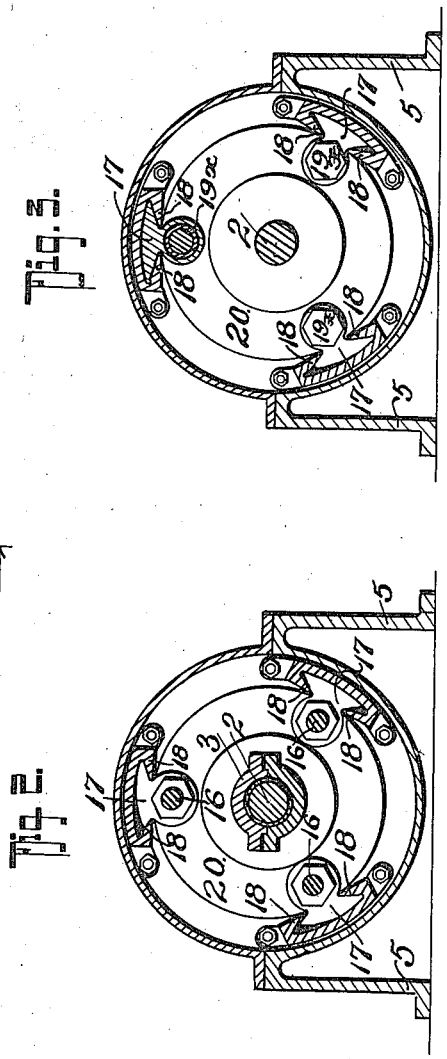
WITNESSES:
Charles H. Wagner,
John J. Schrott
INVENTOR
George Cassady.
BY
Fred G. Dieterichs
ATTORNEYS.

UNITED STATES PATENT OFFICE.

GEORGE CASSADY, OF NEW WESTMINSTER, BRITISH COLUMBIA, CANADA.

POWER-TRANSLATING MECHANISM.

1,001,816.   Specification of Letters Patent.   Patented Aug. 29, 1911.

Original application filed June 23, 1910, Serial No. 568,536. Divided and this application filed April 18, 1911. Serial No. 621,916.

*To all whom it may concern:*

Be it known that I, GEORGE CASSADY, a citizen of the Dominion of Canada, and resident of New Westminster, British Columbia, Canada, have invented certain new and useful Improvements in Power-Translating Mechanism, of which the following is a specification.

My invention relates to that class of power transmitting and motion translating mechanisms in which means are provided for translating reciprocal motion into rotary motion.

My invention is particularly adapted for use on steam engines and the like in which the reciprocations of the piston rods are to be transmitted to a rotatable driving shaft.

My invention resides in those novel details of construction, combination and arrangement of parts, all of which will be first fully described and then specifically pointed out in the appended claims, reference being had to the accompanying drawings, in which—

Figure 1, is a vertical, longitudinal section of a steam engine employing my invention. Fig. 2, is a cross section on the line 2—2 of Fig. 1. Fig. 3, is a detail cross section on the line 3—3 of Fig. 1.

In the drawing in which like numerals and letters of reference indicate like parts in all the figures, 2 represents the driving shaft which is rotatable in bearings 3 and 4 of the base 5.

The engine cylinders are indicated by the number 10, the pistons by 15 and the piston rods by 16.

Mounted on the shaft 2 is an oblique disk-like flange 20 against which the bevel cut bearers 19 contact, one on one side of the flange 20 and the other of a set on the other side of the flange 20. The piston rods 16 extend parallel to the shaft 2 and carry carriages or heads 17 which are supported in slides 18 on the frame heads 6 and 7 of the machine. The head 17 carries the bearers 19 in axial alinement with the piston rod 16 and the outer one of the members 19 has its stem held in a socket of an adjustable bearing 19$^x$ which is screwed into the head 17 and is adapted to be loosened and tightened for purposes of adjustment and taking up wear. The members 19 are rotatable on their central longitudinal axes, the one member 19 at the left in Fig. 1 having its stem 19$^y$ rotatable in the socket 17$^y$ of the head 17, while the other member 19 has its stem 19$^y$ rotatably mounted in the bearing 19$^x$.

In the practical operation of the invention, the piston rods 16 are reciprocated and their motion is translated to the shaft 2 through the flange 20 and members 19.

In this application I make no claim to the construction of the engine *per se*, as that forms the subject matter of my application filed June 23, 1910, Serial No. 568536, of which application the present application is a divisional part.

From the foregoing description, taken in connection with the accompanying drawing, it is thought that the complete construction, operation and advantages of the invention forming the subject matter of this application, will be clearly understood.

What I claim is:—

1. A rotatable shaft, a disk on said shaft set at an oblique angle to the axis of said shaft, a reciprocating head, a pair of rotatable members carried by said head and having bearing heads to engage said disk, one on each side of said disk, whereby the reciprocation of said head that carries the rotatable members, will effect rotation of said disk.

2. A rotatable shaft, a disk on said shaft set at an oblique angle to the axis of said shaft, a reciprocating head, a pair of rotatable members carried by said head and having bearing heads to engage said disk, one on each side of said disk, whereby the reciprocation of said head that carries the rotatable members, will effect rotation of said disk, said rotatable members bearing heads having beveled faces to engage said disk.

3. A rotatable shaft, a disk on said shaft set at an oblique angle to the axis of said shaft, a reciprocating head, a pair of rotatable members carried by said head and having bearing heads to engage said disk, one on each side of said disk, whereby reciprocation of said head that carries the rotatable members, will effect rotation of said disk, and an adjustable bearing socket for one of said rotatable members, whereby adjustment may be made for taking up wear.

4. The combination with a rotatable shaft, a flange carried by said shaft and held in a plane oblique to the axis of rotation, a reciprocating rod paralleling said shaft, means for slidably supporting the outer end of said rod, rotatable bearing pieces carried by said rod to engage the sides of said flange, and means for effecting reciprocation of said rods.

5. The combination with a rotatable shaft, a flange carried by said shaft and held in a plane oblique to the axis of rotation, a reciprocating rod paralleling said shaft, means for slidably supporting the outer end of said rod, rotatable bearing pieces carried by said rod to engage the sides of said flange, means for effecting reciprocation of said rods, said rod supporting means comprising a slide-way, a head mounted in said slide-way to which said rod is connected and in which said rotatable bearing pieces are mounted, said bearing pieces having faces that contact said flange beveled and lying in planes oblique to the longitudinal axes of said rod and shaft.

GEORGE CASSADY.

Witnesses:
 ROWLAND BRITTAIN,
 WM. S. SOUTAR.